United States Patent
Hotelling

(10) Patent No.: US 8,956,036 B2
(45) Date of Patent: *Feb. 17, 2015

(54) METHOD AND APPARATUS FOR BACKLIGHTING A DEVICE

(75) Inventor: Steven Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 774 days.

This patent is subject to a terminal disclaimer.

(21) Appl. No.: 12/176,623

(22) Filed: Jul. 21, 2008

(65) Prior Publication Data

US 2008/0273350 A1 Nov. 6, 2008

Related U.S. Application Data

(63) Continuation of application No. 11/172,225, filed on Jun. 29, 2005, now Pat. No. 7,407,315, which is a continuation of application No. 10/622,266, filed on Jul. 17, 2003, now Pat. No. 6,929,391.

(51) Int. Cl.
 *F21V 8/00* (2006.01)
(52) U.S. Cl.
 CPC ............ *G02B 6/0018* (2013.01); *G02B 6/0021* (2013.01); *Y10S 362/80* (2013.01)
 USPC ........... 362/612; 362/800; 362/362; 362/607; 362/800
(58) Field of Classification Search
 USPC ......... 362/612, 800, 616, 607, 608, 610, 554, 362/555, 556, 577, 560, 89, 243, 245, 240
 See application file for complete search history.

(56) References Cited

U.S. PATENT DOCUMENTS

| | | | |
|---|---|---|---|
| 5,295,216 A | 3/1994 | Halter | |
| 6,322,229 B1 | 11/2001 | Chan et al. | |
| 6,361,180 B1 | 3/2002 | Iimura | |
| 6,364,497 B1 | 4/2002 | Park et al. | |
| 6,402,335 B1 | 6/2002 | Kalantar et al. | |
| 6,498,631 B2 | 12/2002 | Natsuyama | |
| 6,513,943 B2 | 2/2003 | Fukuyoshi | |
| 6,905,237 B2 | 6/2005 | Jacobs et al. | |
| 7,153,018 B2 | 12/2006 | Nomura | |
| 2002/0114153 A1 | 8/2002 | Chan et al. | |
| 2002/0181223 A1 | 12/2002 | Ryu et al. | |
| 2003/0058632 A1 | 3/2003 | Maeda et al. | |
| 2004/0008505 A1 | 1/2004 | Chiang | |
| 2004/0017688 A1 | 1/2004 | Liu | |

*Primary Examiner* — Sharon Payne
(74) *Attorney, Agent, or Firm* — Fletcher Yoder PC

(57) ABSTRACT

A light guide panel is disclosed. The panel comprises a plate for dispersing light and at least one light-emitting diode (LED) coupled to the plate for providing the dispersed light. When the panel is coupled to a keyboard, the at least one LED is under a portion of the keyboard such that when the at least one LED is illuminated, the light from the LED does not distract a user. Accordingly, by strategically placing LEDs within the panel and providing the LEDs under appropriate portions of the keyboard, the device utilizing the keyboard can be smaller than when a conventional light guide panel is utilized. In addition, a further improvement in illumination is provided when a mechanism is provided which reflects light escaping from the edges of the panel back into the panel.

23 Claims, 3 Drawing Sheets

METHOD AND APPARATUS FOR BACKLIGHTING A DEVICE

CROSS-REFERENCE TO RELATED APPLICATIONS

This application is a continuation of the following co-pending application: application Ser. No. 11/172,225, entitled "Method and Apparatus for Backlighting a Device," filed on Jun. 29, 2005, which is a continuation of application Ser. No. 10/622,266, entitled "Light Guide Panel and Method of Use," filed on Jul. 17, 2003, all of which is incorporated herein by reference.

FIELD OF THE INVENTION

The present invention relates generally to the light guide panels and more particularly to an improved light guide panel utilized with display devices.

BACKGROUND OF THE INVENTION

Light guide panels are utilized in keyboard assemblies to backlight the keypads of the keyboard. Typically, such light guide panels utilize a bundle of optical fibers to backlight the keyboard assembly. FIG. 1 is a simplified block diagram of a conventional light guide panel 10. As is seen, an optical fiber bundle 12 is provided there within. The fiber bundle 12 receives light via a ferrule 14. The light for illuminating the fiber bundle is provided via at least one light emitting diode (LED) 16.

When LED 16 is activated, a fiber-mat 18 is illuminated to provide backlighting for the keyboard. The top surface of the fiber-mat 18 is abraded to let a controlled amount of light emit from top surface. The top surface of the fiber-mat 18 is abraded to provide a uniform distribution of light out of the top surface. Much light is lost out of the end of the fiber-mat 18, which is not recaptured.

In addition to the inefficient lighting issues associated with conventional light guide panels, there is also a problem with the size of the panel when utilizing such a panel. As is seen, in the conventional panel 10, each fiber of the fiber bundle 12 must bend at with at least a minimum curvature value to allow light to be provided to the particular fiber. As a result, the radius of curvature shown at 19 must be at least some minimum value to allow for light to come in. For example, for an optical fiber bundle that radius must be 0.5 inch or so to allow for enough light to be brought in to illuminate the fiber mat 10.

Accordingly, this 0.5 inch of radius of curvature adds a 0.5 inch of width onto the panel 10 in the direction, as is shown. As is well known, it is desirable to reduce the size of a keyboard, especially for portable devices, in any way possible. Hence, providing a light guide panel which does not increase the size of the keyboard assembly is desirable.

Accordingly, what is needed is a light guide panel that has increased illumination over conventional light guide panels when in use but does not add to or increase the size of the keyboard. The system must be easy to use, compatible with existing devices and cost effective. The present invention addresses such a need.

Another common technique for providing backlighting is to use a light-guide panel (clear sheet of plastic with texture or printed ink) to disperse the light as needed. However, in the existing light guide panels, the sources for illumination are placed beyond the perimeter of the lighted area. This increases the overall form-factor of the light guide panel and is undesirable.

SUMMARY OF THE INVENTION

A light guide panel is disclosed. The panel comprises a plate for dispersing light and at least one light-emitting diode (LED) coupled to the plate for providing the dispersed light. When the panel is coupled to a keyboard, the at least one LED is under a portion of the keyboard such that when the at least one LED is illuminated, the light from the LED does not distract a user. Accordingly, by strategically placing LEDs within the panel and providing the LEDs under appropriate portions of the keyboard, the device utilizing the keyboard can be smaller than when a conventional light guide panel is utilized. In addition, a further improvement in illumination is provided when a mechanism is provided which reflects light escaping from the edges of the panel back into the panel.

BRIEF DESCRIPTION OF THE DRAWINGS

FIG. 4A illustrates a conventional light guide panel.

DETAILED DESCRIPTION

The present invention relates generally to the light guide panels and more particularly to an improved light guide panel utilized with display devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A light guide panel in accordance with the present invention comprises a plate for dispersing light and a plurality of light emitting diodes coupled to the plate, wherein the panel is coupled to the keyboard, the plurality of light emitting diodes are under a portion of the keyboard such that the light from the LEDs does not distract a user. In so doing, the form factor of the light guide panels can be smaller than conventional light guide panels and more light is emitted thereby. To further describe the features of the present invention, refer now to the following description of this invention with the accompanying drawings.

Figure 1:
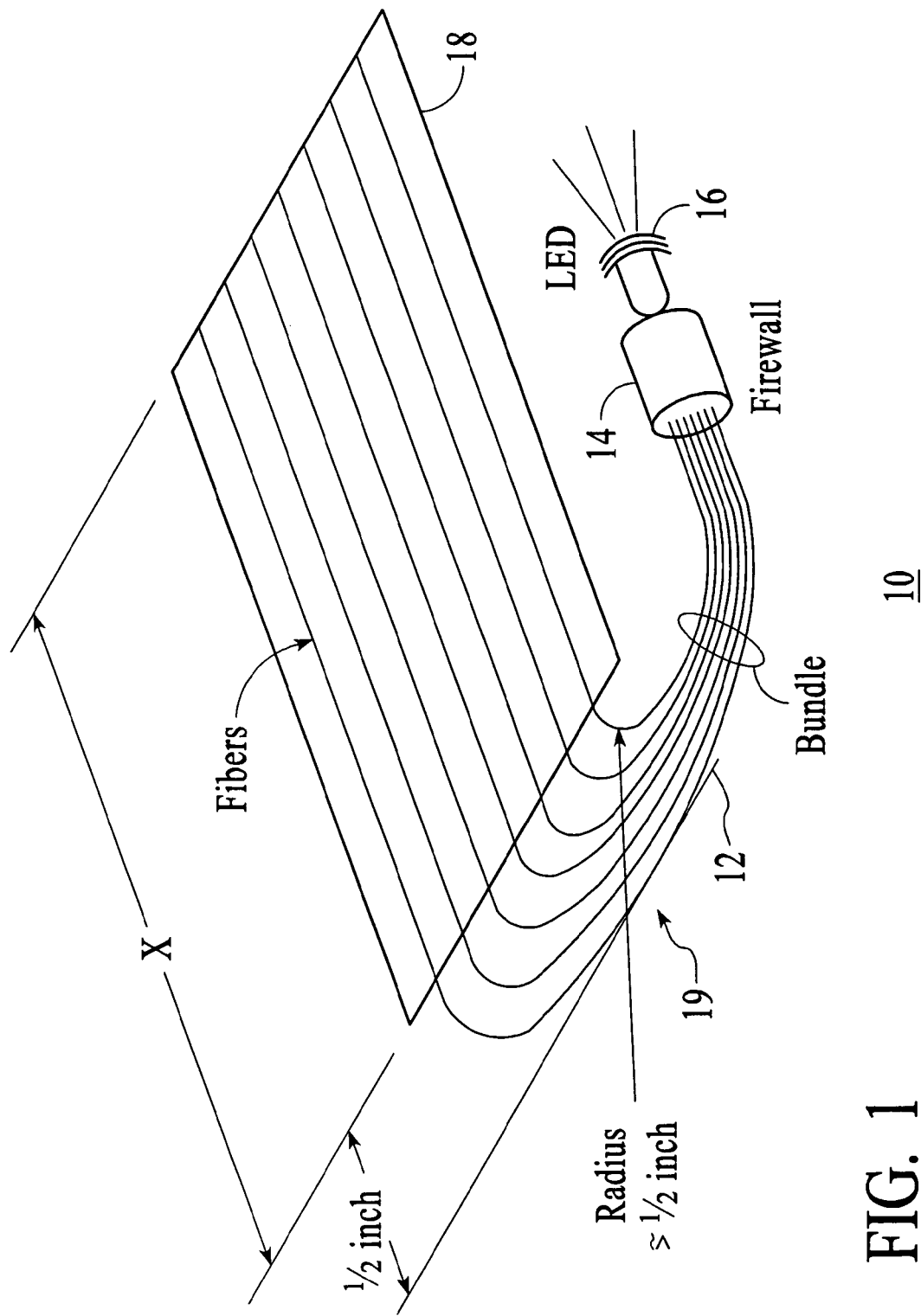
FIG. 1 is a simplified block diagram of a conventional light guide panel.
Figure 2:
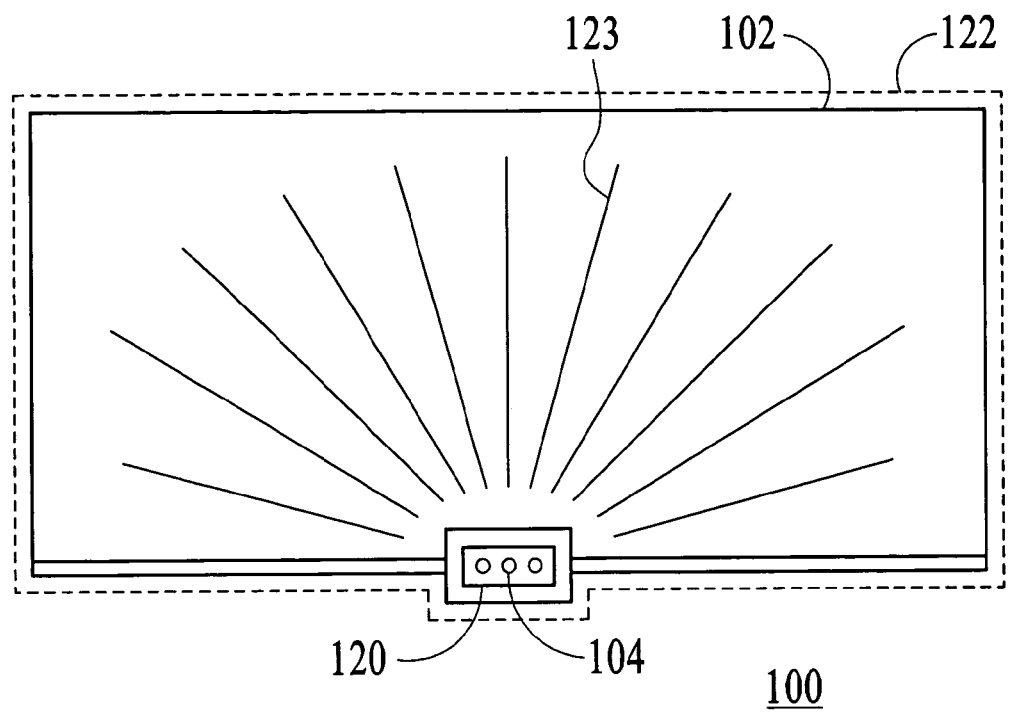
FIG. 2 illustrates a first embodiment of a light guide panel in accordance with the present invention.

FIG. 2 illustrates a first embodiment of a light guide panel 100 in accordance with the present invention. The light guide panel 100 includes a plate 102. The plate 102 includes a plurality of optical fibers 123 therein. The light guide panel 100 further includes a plurality of light emitting diodes (LEDs) 104 coupled to the plate 102 and which provide light to the optical light guide panel 123 to backlight the keyboard. In this embodiment, the LEDs 104 are under the opaque space bar 120 (shown in outline form) of the keyboard 122 (also shown in outline form). In so doing, there are no bright spots on the keyboard when the LEDs 104 are illuminated. By providing the LEDs 104 directly within the plate 102 rather than through the fiber optic bundle as in the conventional light guide panel 10 of FIG. 1, the size of the light guide panel 100 is reduced, and in addition, the illumination is improved.

In the embodiment of FIG. 2, the space bar 120 is used to prevent bright spots. However, one of ordinary skill in the art recognizes that there could be a variety of other places that the LEDs could be located and their use would be within the spirit and scope of the present invention. The key feature is that the LEDs are under a portion of the keyboard that will not distract a user.

Figure 3:
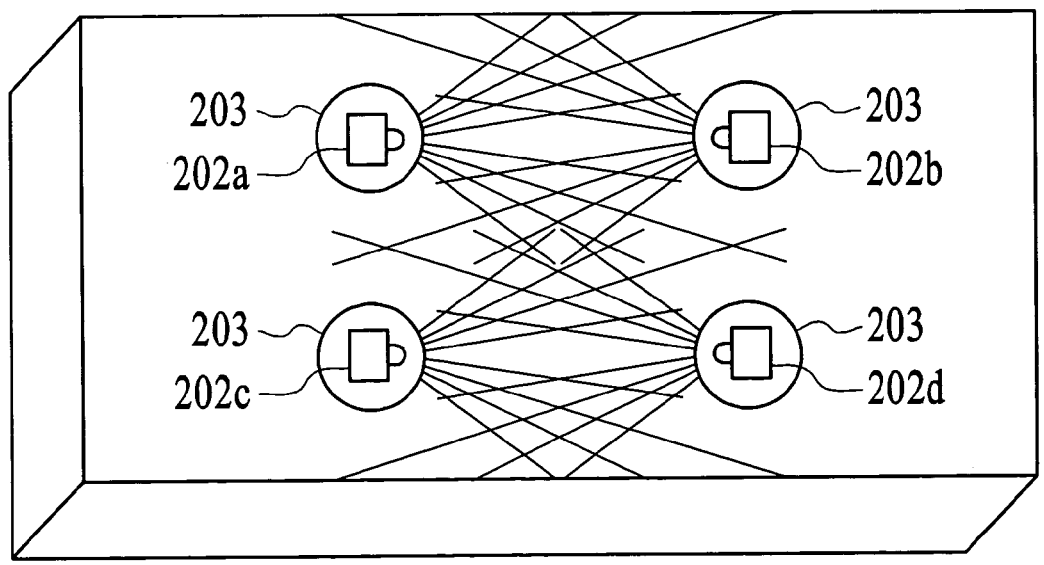
FIG. 3 illustrates a second embodiment of a light guide panel in accordance with the present invention.

FIG. 3 illustrates a second embodiment of a light guide panel 200 in accordance with the present invention. Four LEDs 202a-202d are located on specific points of a light guide panel 202 with opaque portions 203 thereover. By strategically placing the LEDs in the appropriate place there is a more even distribution of light. The LEDs could be placed, for example, under a logo, a number keypad or other appropriate portion of the keyboard. In so doing, there may be a bright spot, but it will not distract the user. It should be understood that although four LEDs are shown in this figure, one of ordinary skill in the art recognizes that any number of LEDs could be utilized and their use would be within the spirit and scope of the present invention.

To further improve upon the illumination characteristics of the light guide panel, a system and method in accordance with the present invention includes a mechanism for increasing the total usage of light within the light guide panel and decreasing wasted light emission. Referring now to FIG. 4A, which is a simplified illustration of a conventional light guide panel 300, the light escapes at the ends of the panel based on the edges being straight thereon, and including no means to reflect the escaping light back into the panel. With the ends 302 being straight, the light, instead of being reflected in any fashion, will simply be transmitted out the ends 302 of the panel 300.

Figure 4B:
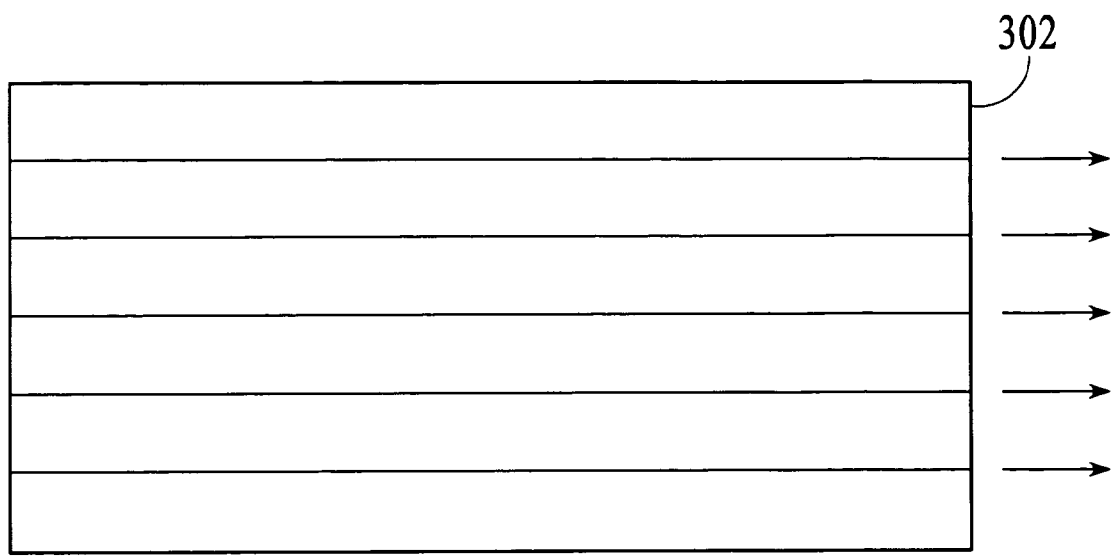
FIG. 4B illustrates an embodiment of the light guide panel in accordance with the present invention, in which the ends of the panel appear as jagged.
Figure 4B:
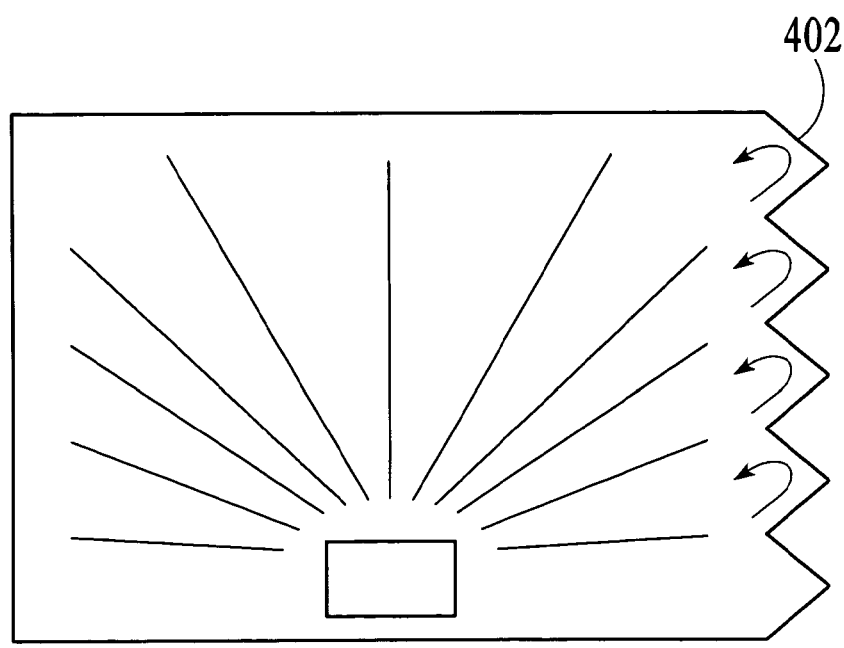

In a system and method in accordance with the present invention, as seen in FIG. 4B, the ends 402 of the panel 400 are jagged in appearance (the jagged ends are exaggerated). Through reflection of the light from the jagged ends, the light is reused which allows for more illumination since the total internal reflection value is greater. There are a variety of mechanisms that could be utilized to make the ends of the panel reflect the light back into the panel. Another method for reflecting the light back into the panel is to provide sheet metal flanges (which may be inexpensively manufactured as part of the keyboard metal base plate) which are parallel to the edges of the light guide panel. The light escaping from the panel is reflected off of the sheet metal surfaces and back into the light guide panel.

Accordingly, the system that utilizes a mechanism that optimizes the reflection at the edges of the panel, in combination with the LEDs being strategically placed, will provide for a smaller form factor for the keyboard assembly as well as an improvement in light and illumination.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A light guide panel comprising:
a plate comprising an internal reflecting mechanism and a plurality of optical fibers for dispersing light through the plate, wherein the internal reflecting mechanism is configured to increase a total internal reflection value of the plate and reflect light at an edge of the plate back into the plate; and
at least one light-emitting diode (LED) coupled to the plate for providing the light.

2. The light guide panel of claim 1 wherein the at least one LED is located under an opaque covering.

3. The light guide panel of claim 1 wherein the at least one LED comprises a plurality of LEDs.

4. The light guide panel of claim 3 wherein the plurality of LEDs are strategically placed to provide for even distribution of light.

5. The light guide panel of claim 1 wherein the internal reflecting mechanism comprises jagged edges formed at the edge of the plate.

6. An assembly comprising:
a device; and
a light guide panel coupled to the device, wherein the light guide panel comprises:
a plate comprising:
a plurality of optical fibers for dispersing light through the plate to illuminate the plate; and
an internal reflecting mechanism configured to increase a total internal reflection value of the plate and reflect the light at an edge of the plate back into the plate; and
at least one LED coupled to the plate for providing the light.

7. The assembly of claim 6 wherein the at least one LED is located under an opaque portion of a device.

8. The assembly of claim 6 wherein the plate includes a clear sheet of material with a printed dot pattern for dispersing light.

9. The assembly of claim 6 wherein the at least one LED comprises a plurality of LEDs.

10. The assembly of claim 9 wherein the plurality of LEDs are strategically placed to provide for even distribution of light.

11. The assembly of claim 6 wherein the internal reflecting mechanism comprises jagged edges on an end of the plate.

12. A light guide panel comprising:
a plate for dispersing light, wherein the plate comprises:
a plurality of optical fibers completely within the plate; and
an internal reflecting mechanism configured to increase a total internal reflection value of the plate and reflect the light at an edge of the plate back into the plate; and
a plurality of light-emitting diodes (LEDs) coupled to the plate and configured to provide the light to the plurality of optical fibers.

13. The light guide panel of claim 12 wherein the plurality of LEDs are located under opaque coverings.

14. The light guide panel of claim 12 wherein the internal reflecting mechanism comprises jagged edges on the edge of the plate.

15. The light guide panel of claim 1, wherein the at least one LED is located in a central portion of the plate such that the at least one LED does not touch the edge of the plate, and wherein the at least one LED is located under an opaque portion of the device.

16. The assembly of claim 6, wherein the at least one LED is located in a central portion of the plate such that the at least one LED does not touch the edge of the plate, and wherein the at least one LED is located under an opaque covering.

17. The light guide panel of claim 12, wherein the plurality of LEDs are located in a central portion of the plate such that the plurality of LEDs do not touch the edge of the plate, and wherein the plurality of LEDs are located under opaque portions of the device.

18. The light guide panel of claim 1, wherein the internal reflecting mechanism comprises sheet metal flanges.

19. The assembly of claim 6, wherein the internal reflecting mechanism comprises sheet metal flanges.

20. A light guide panel comprising:
- a plate comprising an internal reflecting mechanism, wherein the internal reflecting mechanism is configured to increase a total internal reflection value of the plate and reflect light at an edge of the plate back into the plate along a first plane, wherein the plate is configured to transmit the light in a direction substantially perpendicular to the first plane to be viewed by a user; and
- at least one light-emitting diode (LED) coupled to the plate to emit light into the plate.

21. The light guide panel of claim 20 wherein the at least one LED is located under an opaque covering.

22. The light guide panel of claim 20 wherein the internal reflecting mechanism comprises jagged edges formed at the edge of the plate.

23. The light guide panel of claim 20, wherein the internal reflecting mechanism comprises sheet metal flanges.

\* \* \* \* \*